Figure 1:
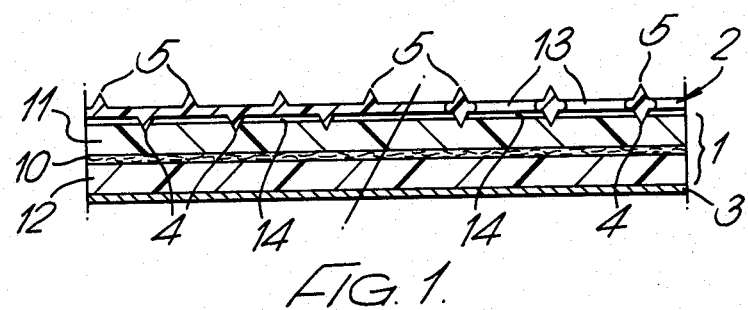

United States Patent [19]

Twyford et al.

[11] Patent Number: 4,789,578
[45] Date of Patent: Dec. 6, 1988

[54] PROTECTION MEMBRANE

[75] Inventors: David R. Twyford, Dunstable; Edward E. Hankins, Ashford, both of England

[73] Assignee: Premier Coatings Limited, Ashford, England

[21] Appl. No.: 50,054

[22] Filed: May 14, 1987

[30] Foreign Application Priority Data

May 16, 1986 [GB] United Kingdom ............... 8611941

[51] Int. Cl.⁴ .................. B32B 3/06; B32B 3/10; B32B 3/14; B32B 3/30; B32B 5/02
[52] U.S. Cl. .......................... 428/40; 428/107; 428/109; 428/110; 428/112; 428/138; 428/192; 428/291; 428/351; 428/354; 428/440; 428/489; 428/57
[58] Field of Search ............... 428/489, 141, 143, 151, 428/291, 440, 468, 40, 192, 107, 109, 110, 112, 138, 351, 354, 489

[56] References Cited

U.S. PATENT DOCUMENTS

| 3,091,898 | 6/1963 | Fasold et al. | 428/489 X |
| 3,607,589 | 9/1971 | Schirtzinger | 428/489 X |
| 3,967,039 | 6/1976 | Plotz et al. | 428/489 X |
| 4,219,603 | 8/1980 | Thun | 428/489 X |
| 4,351,873 | 9/1982 | Davis | 428/489 X |
| 4,617,221 | 10/1986 | von der Chys | 428/489 X |

FOREIGN PATENT DOCUMENTS

| 3440263 | 1/1986 | Fed. Rep. of Germany | 428/489 |
| 1007019 | 3/1977 | Japan | 428/489 |
| 2840599 | 3/1980 | Japan | 428/489 |
| 5152054 | 11/1980 | Japan | 428/489 |

Primary Examiner—James C. Cannon
Attorney, Agent, or Firm—Cumpston & Shaw

[57] ABSTRACT

The invention relates to protective waterproof membranous sheeting which will prevent the passage of water and corrosive salt solutions into structures.

The protection membrane comprises a bituminous adhesive waterproof sheet 1, a flexible polymeric protection grid 2 and a release sheet 3. The waterproof sheet 1 may comprise a fibre core in a matrix of a polymer modified bitumen polymer. The protection grid is partially embedded in the waterproof sheet 1, and is formed with drainage channels 13,14 on each face, provided by ribs or strands 4 and 5 defining the grid. The aperture size of the grid may be up to about 10 mm across. A filter web may be fixed to the face of the grid.

12 Claims, 1 Drawing Sheet

U.S. Patent     Dec. 6, 1988     4,789,578

PROTECTION MEMBRANE

This invention relates to protection membranes or membranous sheeting used in the waterproof protection of underground structures such as basements, subways, storage silos and underground garages.

These underground structures are usually made from reinforced concrete which is susceptible to damage from corrosive salt solutions and water. Such solutions are often formed by salts (e.g. sulphates) in the surrounding environment dissolving into the ground water and forming aqueous acids.

To combat this problem, it is known to coat the external surfaces of the underground structure with a water impervious plastic sheeting or a bitumen solution. Such sheeting is conveniently supplied in large rolls and may have a pressure sensitive adhesive applied to one surface which is protected by a release sheet. In use, the release sheet is removed and the water impervious sheeting is applied manually to the external surfaces of the concrete structure. However, it has been found that these known sheets are often punctured and ruptured. This is especialy so when the backfill (i.e. soil and rubble) is placed around the underground structure. These ruptured areas allow water and corrosive salts to pass through the sheeting and attack the structure.

To overcome this problem, a further operation involving the attachment of rigid, puncture proof protection boards over the sheeting is carried out. This, however, is unsatisfactory, since the protection of curved areas having small radii, such as corners, is very difficult to achieve. Furthermore, as a further operation is involved which is labor intensive, the cost of applying the entire protection assembly, i.e. sheets and boards, is quite substantial.

This known arrangement has a further drawback in that water tends to build up around the external surface of the protection boards. Therefore, to assist drainage, a thin water-permeable, but soil-impermeable, polypropylene filter web is placed on top of the protection boards. This provides a small drainage channel which allows the water to drain away.

The present invention seeks to overcome the drawbacks and problems associated with previous waterproof membranous sheeting systems by providing a one-piece protection membrane or membranous sheeting which will prevent the passage of water and corrosive salt solutions into structures and which does not have to be separately protected, and yet will allow continuous and complete protective coverage on areas such as corners.

According to the present invention, we provide a protection membrane, comprising a bituminous adhesive waterproof sheet having on one face a flexible polymeric protection grid, said grid having strands of polymeric material projecting from at least one face thereof which define channels extending across the face of the grid.

In a preferred embodiment the apertures in the grid are not greater than about 10 mm wide. These apertures may be square, circular or any other shape.

Preferably the apertures are between about 2 mm and 10 mm wide, ideally between about 4 mm and 8 mm. A preferred width is 5 mm or 6 mm wide. The width of the channels is preferably similar to that of the apertures. It is preferred that the grid has an overall thickness of about 4–5 mm, and that the strands defining the channels project from a face of the grid by 2–3 mm. Preferably, the bituminous sheet is about 2–3 mm thick.

Preferably, the grid is formed from two sets of parallel strands, each set extending transversely of the other, and wherein a lower set is partially embedded in said waterproof sheet and an upper set of strands runs across said lower set, thereby forming a first set of continuous open channels between said upper set and a second set of channels between said lower set of strands which run beneath said upper set.

Preferably, the waterproof sheet comprises a woven or non-woven fiber core in a flexible, water-impervious matrix. The fiber material may be polyester, glass or polypropylene or any other suitable organic or inorganic fibrous material. The flexible water-impervious matrix may be a polymer modified bitumen. Such polymer modified bitumen matrix may comprise a mixture of bitumen and rubber in proportions which give the required flexibility. Examples of such polymer modified bituminous matrix are well known to those skilled in the art.

To facilitate lap joining, one edge of the membrane may be left uncovered by the grid, or an additional coating of polymer modified bitumen may be applied to the grid, and there may then be a release coated sheet applied to the exposed face of the bitumen. A filter web may be fixed onto the grid.

Figure 2:
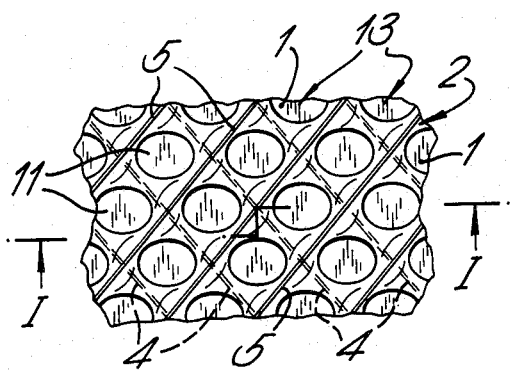

A preferred embodiment of the present invention is now described by way of example only with reference to the accompanying drawings, in which:

FIG. 1 is an enlarged schematic section on the line I—I of FIG. 2, not to scale, of a protection membrane, and FIG. 2 is a plan view of a portion of protection membrane.

Referring to the drawings, the protection membrane comprises a waterproof sheet 1, protection grid 2 and a release sheet 3.

The waterproof sheet 1 comprises a core 10 of woven or non-woven organic or inorganic fiber, e.g. polyester, in a matrix of a polymer modified bitumen polymer made up of upper and lower layers 11 and 12. The sheet is flexible. The nature of the matrix is such that if it is pierced by a sharp, thin, needle-like object, the hole formed therein will be self-sealed by the bitumen polymer itself. The core 10 is not absolutely essential, but it adds strength and helps to reduce the piercing of the sheet by a needle-like object.

Partially embedded in one face of the waterproof sheet 1 is a protection grid 2 comprising two sets of thermoplastic or other elastomeric, parallel strands 4, 5. The sets of strands are formed as an integral grid, one such grid being sold under the name NETLON (R.T.M.). A lower set of strands 4 is partially embedded in the waterproof sheet 1 (i.e. in layer 11) whilst an upper set 5 runs across the upper surface of the lower set 4. This arrangement provides main channels 13 running between the upper strands 5 and minor channels 14 which run between the lower set 4 and beneath the upper set 5. These act as channels for the drainage of water. The grid 2 will retain fines from the soil and thus improve soil stability at the soil/protection membrane interface. Thus the necessity for adding a polypropylene web is reduced. However, if the surrounding environment is such that additional soil stability is required, then a proprietary polypropylene filter web (not shown) can be laid across the top or outer face of the protection grid 2. The drainage system resulting has superior characteristics to previous systems, as water can be removed in the drainage channels 14, 15 formed by the grid. Advantageously, the web is fixed over the grid 2 after the protection membrane is applied to the surface of the structure.

The construction of the membrane is such that the protection grid prevents the puncture of the waterproof sheet 1 by large particles, which are greater in size than the aperture size of the grid, and the internal fibre core will resist penetration by particles smaller than these.

Because of the nature of the polymer modified bitumen, the side of the waterproof sheeting remove from the grid 2 acts as a pressure sensitive adhesive. This adhesive face is covered with the release sheet 3 which facilitates easy handling of the protection membrane before use. Once the sheet 3 is removed, the membrane is easily adhered to an underground concrete (or like) structure.

The flexible nature of the protective membrane allows a complete and continuous protective cover on areas such as corners. It allows the supply of a complete product (i.e. a waterproof membrane and a protection member) in roll form and does away with the time-consuming operation of fixing separate protection boarding.

The membrane by virtue of its construction will not degrade biologically nor will its properties be adversely affected by immersion in water or naturally occurring salt solutions.

The side edges are joined on site by lap joining of at least 50 mm. This is facilitated by either one edge being left uncovered by the grid for at least 50 mm and protected by a release coated sheet or interleave or by a coating of polymer modified bitumen being applied to one edge of the grid to a width of about 50 mm and protected by a release coated interleave or sheet.

It will thus be appreciated that the invention provides a waterproof barrier membrane consisting of a flexible non-biodegradable pre-formed adhesive waterproof sheet with resistance to impact and puncture and which improves the interfacial soil stability in a single operation.

It will be understood that the above described embodiment has only been described by way of example and modifications in detail may be made within the scope of the invention.

We claim:

1. A protection membrane comprising a bituminous adhesive waterproof sheet; a flexible polymeric protection grid adhered to an upper face of said sheet, a plurality of strands of polymeric material projecting from said upper face to define grid apertures, said strands extending transverse to each other so as to reinforce said waterproof sheet in two directions transverse to each other and to protect said waterproof sheet from puncturing due to impact, with at least some of said strands being at least partially embedded in said waterproof sheet.

2. A protection membrane as claimed in claim 1 wherein said apertures formed in said grid are not greater than about 10 mm across.

3. A protection membrane as claimed in claim 1 wherein said apertures formed in said grid are about 5 mm across.

4. A protection membrane as claimed in claim 1 wherein said grid is formed from two sets of parallel strands, each set extending transversely of the other and wherein a lower set is partially embedded in said waterproof sheet and an upper set of strands runs across said lower set, thereby forming a first set of continuous open channels between said upper set and a second set of channels between said lower set of strands which run beneath said upper set.

5. A protection membrane as claimed in claim 1 wherein said waterproof sheet comprises a fibre or sheet core in a flexible water-impervious matrix.

6. A protection membrane as claimed in claim 5 wherein said fibre or sheet core is made of polyester, glass or polypropylene.

7. A protection membrane as claimed in claim 5 wherein said water-impervious matrix is a polymer modified bitumen.

8. A protection membrane according to claim 1 wherein said water-impervious matrix is a polymer modified bitumen.

9. A protection membrane as claimed in claim 1 wherein one edge of said membrane is left uncovered by said grid for facilitating lap joining, and is protected by a release coated sheet.

10. A protection membrane as claimed in claim 1 wherein an additional coating of polymer modified bitumen is applied to one edge of said grid for facilitating lap joining and is protected by a release coated sheet.

11. A protection membrane as claimed in claim 1 wherein a filter web is fixed onto the grid.

12. A protection membrane according to claim 1 wherein a release sheet is adhered to the face of the membrane remote from said grid.

* * * * *